United States Patent
Hirsch et al.

(10) Patent No.: US 10,852,028 B2
(45) Date of Patent: Dec. 1, 2020

(54) HEAT EXCHANGER BLOCK AND HEAT RECOVERY VENTILATION UNIT COMPRISING IT

(71) Applicant: ZEHNDER GROUP INTERNATIONAL AG, Granichen (CH)

(72) Inventors: Christian Hirsch, Eibenstock (DE); Arie Veldhuijzen, Genemuiden (NL); Martijn Haddeman, Heerde (NL)

(73) Assignee: Zehnder Group International AG, Granichen (CH)

( * ) Notice: Subject to any disclaimer, the term of this patent is extended or adjusted under 35 U.S.C. 154(b) by 71 days.

(21) Appl. No.: 15/544,819

(22) PCT Filed: Jan. 20, 2016

(86) PCT No.: PCT/IB2016/000034
§ 371 (c)(1),
(2) Date: Jul. 19, 2017

(87) PCT Pub. No.: WO2016/162738
PCT Pub. Date: Oct. 13, 2016

(65) Prior Publication Data
US 2018/0010820 A1 Jan. 11, 2018

(30) Foreign Application Priority Data
Jan. 26, 2015 (EP) ................................. 15000150

(51) Int. Cl.
*F24F 12/00* (2006.01)
*F28F 13/06* (2006.01)
(Continued)

(52) U.S. Cl.
CPC .............. *F24F 12/006* (2013.01); *F28D 9/00* (2013.01); *F28D 9/0037* (2013.01);
(Continued)

(58) Field of Classification Search
CPC .......... F24F 12/006; F24F 13/24; F24F 13/06; F24F 13/08; F28D 9/00; F28D 9/0037; F28D 9/0068; F28F 13/06; F28F 13/08
See application file for complete search history.

(56) References Cited

U.S. PATENT DOCUMENTS 4,512,392 A * 4/1985 van Ee ................. F24F 12/001
165/166
4,512,393 A * 4/1985 Maendel .............. A01K 1/0076
165/54
(Continued)

FOREIGN PATENT DOCUMENTS

DE 102012017938 A1 * 3/2014 ............ F24F 5/0071
EP 1134510 A1 9/2001
(Continued)

*Primary Examiner* — Devon Russell
(74) *Attorney, Agent, or Firm* — Maxwell L. Minch; Maxwell L. Minch, Esq.

(57) ABSTRACT

The invention relates to a heat exchanger block 2 and to a heat recovery ventilation unit 1 comprising such a heat exchanger block. In the heat exchanger block 2, the individual flow cross-section (Q1) of flow passages of said plurality of first air flow passages (AFP1) in said parallel flow region (PF) and the individual flow cross-section (Q2) of flow passages of said plurality of second air flow passages (AFP2) in said parallel flow region (PF) gradually, preferably linearly, decrease along a straight line (x-x) perpendicular to the parallel air flow passages (AFP1 and AFP2) and from said first wall (W1) to said second wall (W2) of the block.

18 Claims, 9 Drawing Sheets

(51) Int. Cl.
 *F28F 13/08* (2006.01)
 *F28D 9/00* (2006.01)
 *F28F 13/14* (2006.01)

(52) U.S. Cl.
 CPC ............ *F28D 9/0068* (2013.01); *F28F 13/06* (2013.01); *F28F 13/08* (2013.01); F28D 9/0031 (2013.01); F28D 9/0062 (2013.01); F28F 13/14 (2013.01); F28F 2210/08 (2013.01); F28F 2215/04 (2013.01); F28F 2250/108 (2013.01); Y02B 30/563 (2013.01)

(56) References Cited

U.S. PATENT DOCUMENTS

| | | | | |
|---|---|---|---|---|
| 4,799,539 A | * | 1/1989 | Atkin | F24F 12/001 165/54 |
| 6,250,373 B1 | * | 6/2001 | Vecchi | F24F 1/0007 165/53 |
| 6,401,802 B2 | * | 6/2002 | Cottingham | F24F 12/006 165/54 |
| 10,132,522 B2 | * | 11/2018 | Erb | B21D 53/02 |
| 2006/0260790 A1 | * | 11/2006 | Theno | F24F 12/006 165/166 |
| 2009/0314480 A1 | * | 12/2009 | Grinbergs | F24F 3/1411 165/174 |
| 2011/0277970 A1 | * | 11/2011 | Tsuji | F24F 12/006 165/121 |
| 2015/0338122 A1 | * | 11/2015 | Byne | F24F 13/12 165/54 |

FOREIGN PATENT DOCUMENTS

| | | |
|---|---|---|
| EP | 2767777 A1 | 8/2014 |
| FR | 2313651 | 12/1976 |
| FR | 3000189 A1 | 6/2014 |

\* cited by examiner

HEAT EXCHANGER BLOCK AND HEAT RECOVERY VENTILATION UNIT COMPRISING IT

The present invention relates to a heat exchanger block and to a heat recovery ventilation unit comprising such a heat exchanger block, for providing supply air, preferably outside air or fresh air, to an apartment or parts thereof and for removing return air, preferably exhaust air or used air, from said apartment or parts thereof.

Heat recovery ventilation units have been used for many years in ventilation systems to recover heat from exhaust air exiting a house or an apartment to the surrounding atmosphere. A heat exchanger is used to transfer heat from the exhaust air exiting the house or the apartment to the outside air entering the house or the apartment. Such ventilation systems comprise an arrangement of ducts for transporting air between selected rooms of an apartment (or house) and the surrounding atmosphere. More precisely, such heat recovery ventilation systems comprise ducts collecting return air (used air) from the rooms, ducts for distributing supply air (fresh air) to the rooms on the one hand, and ducts for transporting exhaust air from the apartment to the atmosphere and ducts for transporting outside air from the atmosphere to the apartment. A heat recovery ventilation unit is located at a crossing point at which the ducts of these four air types meet. Consequently, such heat recovery ventilation units comprise a supply air outlet, a return air inlet, an exhaust air outlet, an outside air inlet and a heat exchanger inside the unit.

It is an object of the invention to provide a heat recovery ventilation unit which, on the one hand, is compact and which, on the other hand, still allows enough air throughput without requiring too much energy for driving the ventilators in the unit and thus, without creating too much air flow noise.

Figure 1:
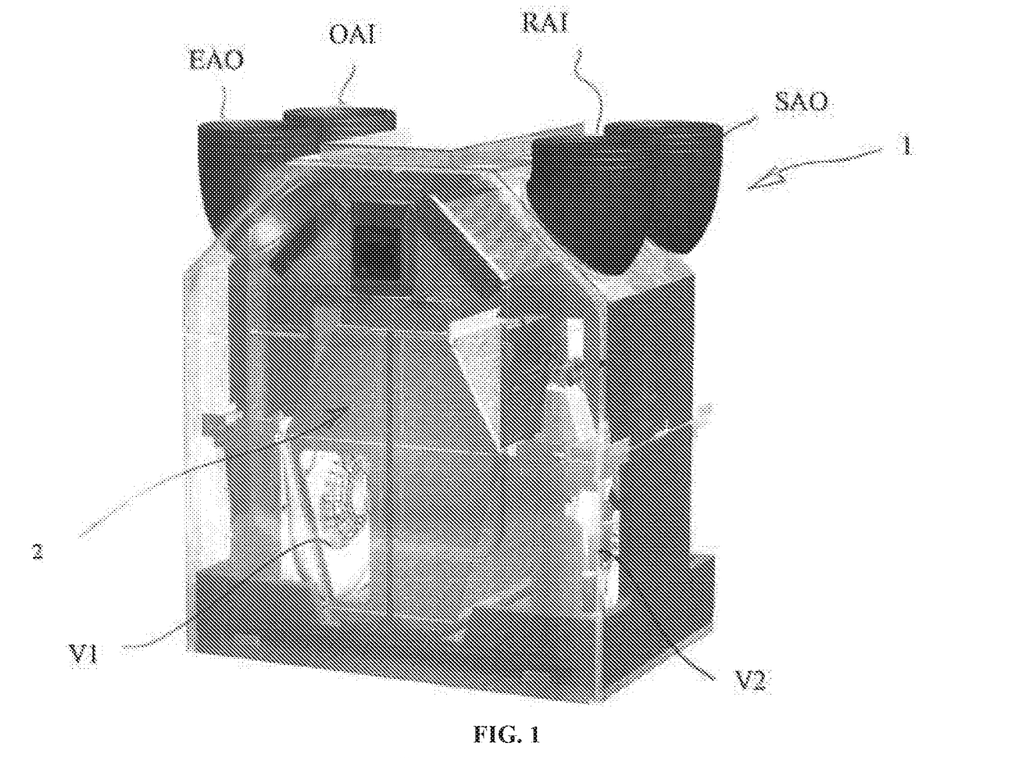
FIGS. 1 to 2 are a perspective view of an embodiment of the heat recovery ventilation unit according to the invention.
Figure 2:
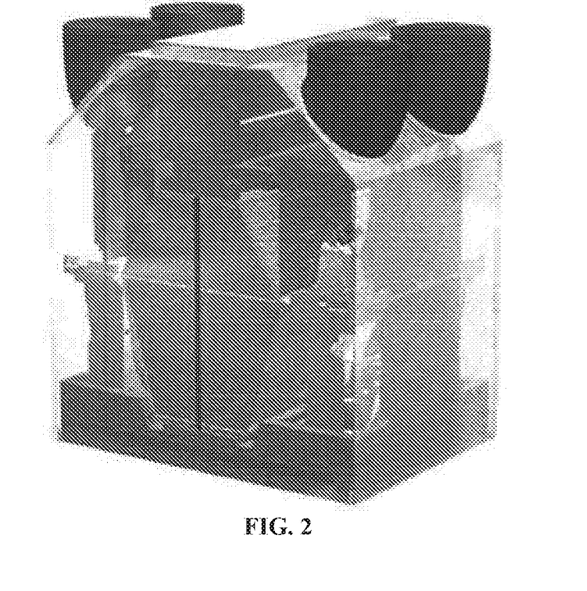
Figure 3:
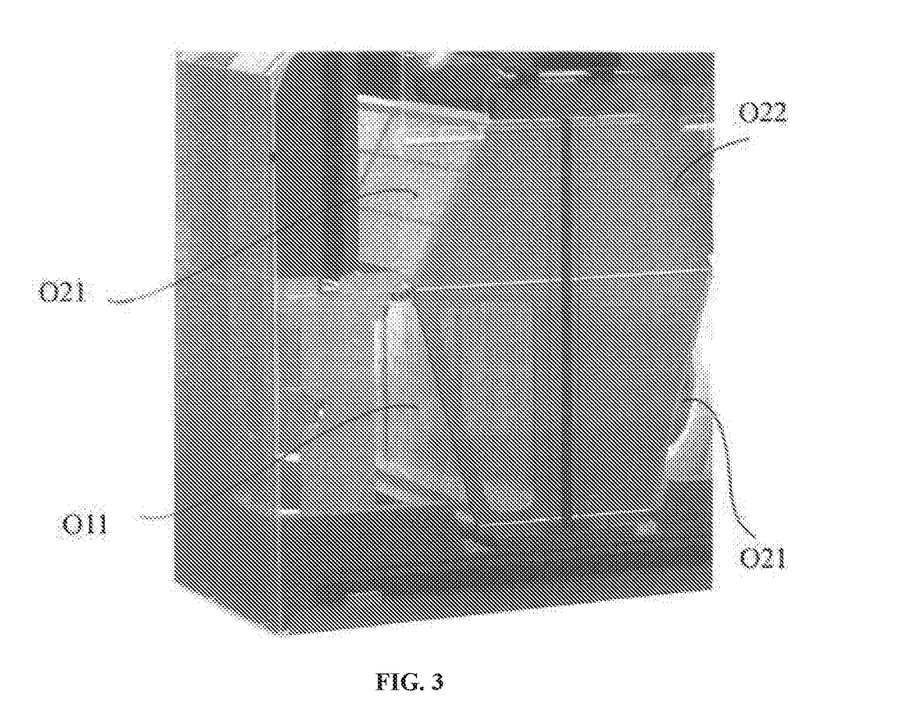
FIGS. 3 to 4 are a perspective view of an embodiment of the heat exchanger block according to the invention.
Figure 4:
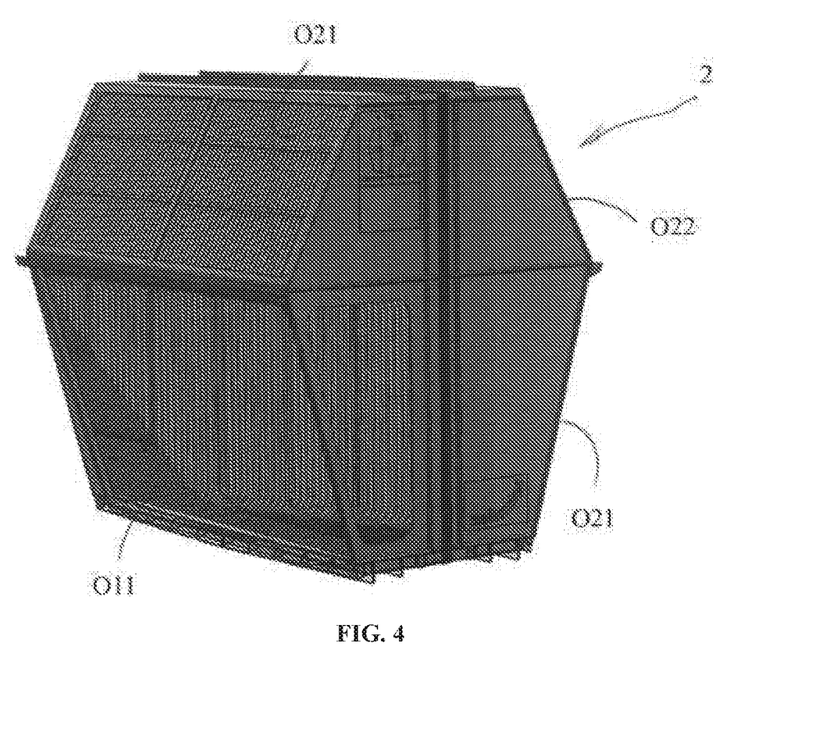
Figure 5:
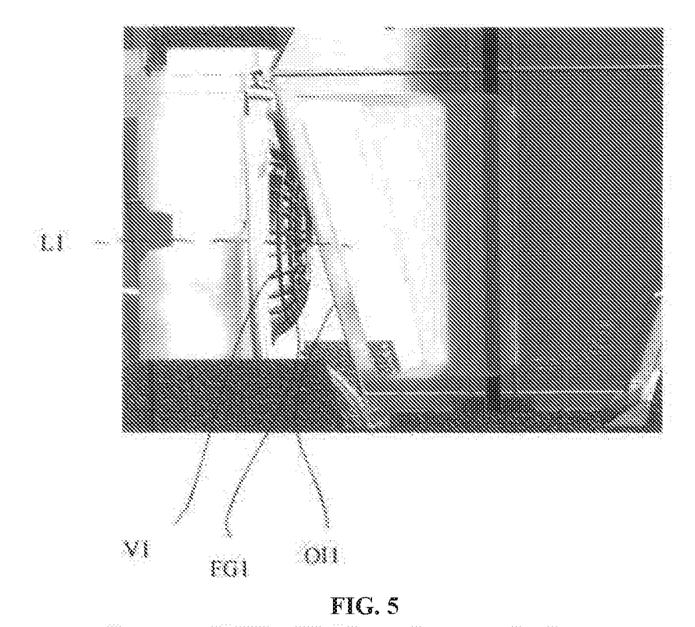
FIGS. 5 to 17 show further features of the heat recovery ventilation unit or of the heat exchanger block according to the invention.
Figure 6:
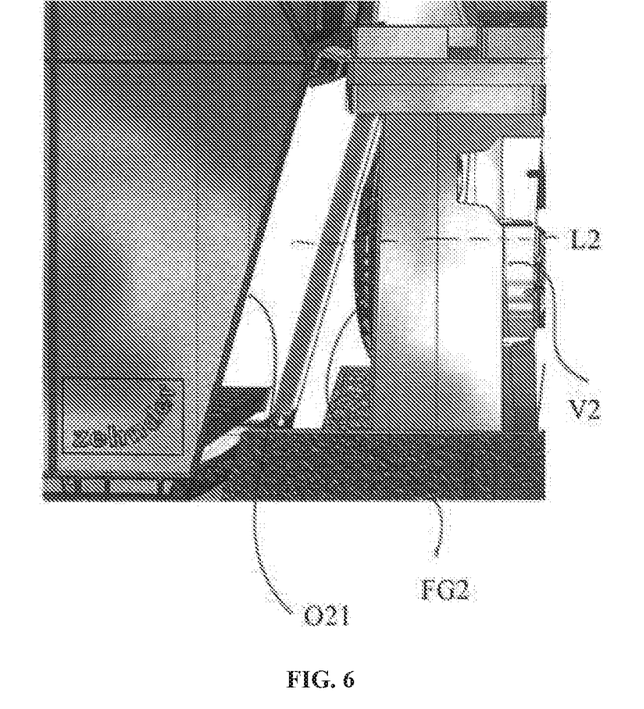
Figure 7:
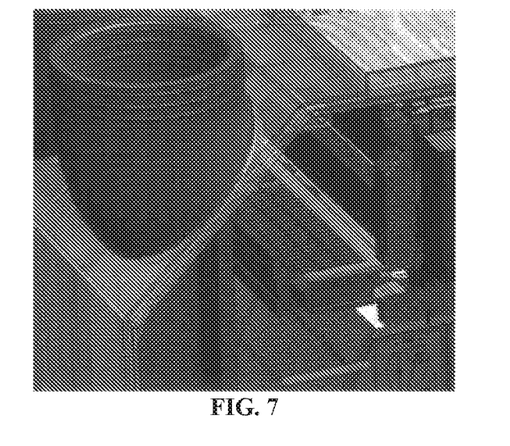
Figure 8:
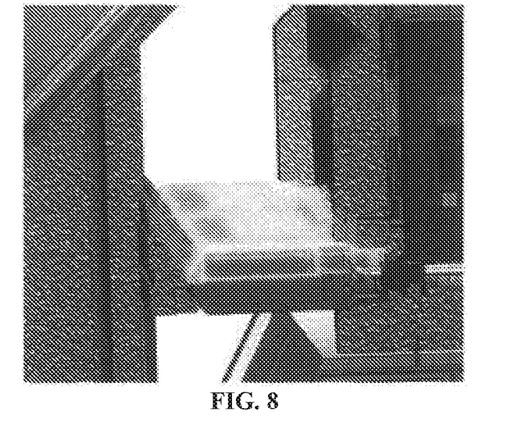
Figure 9:
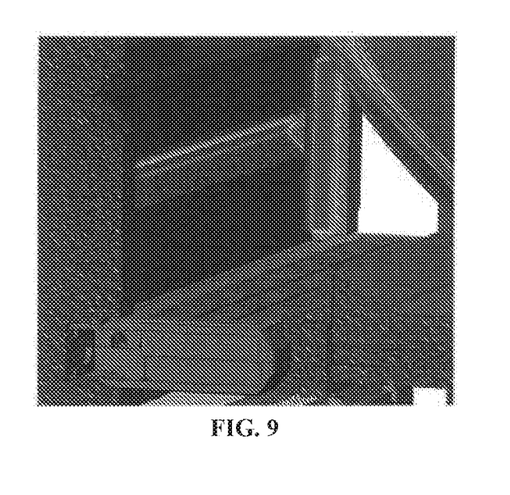
Figure 10:
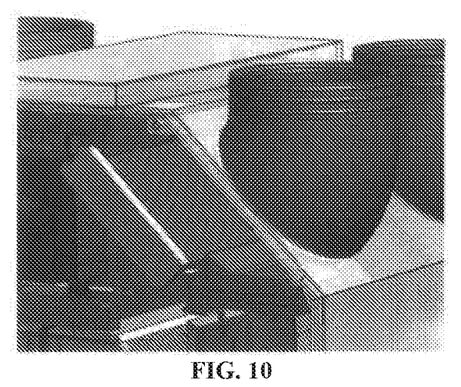
Figure 11:
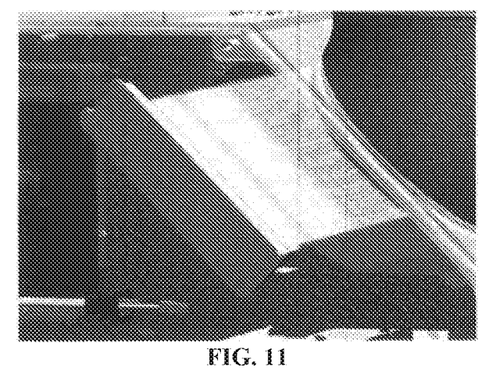
Figure 12:
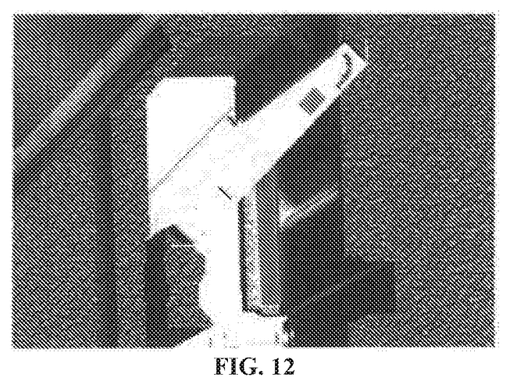
Figure 13:
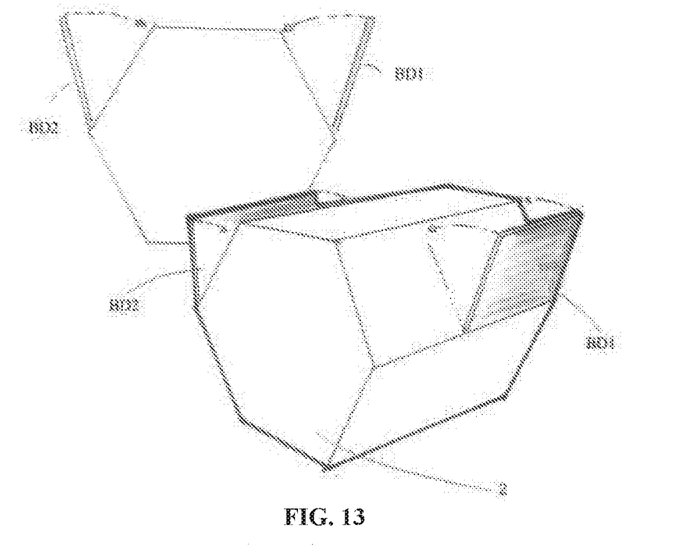
Figure 14:
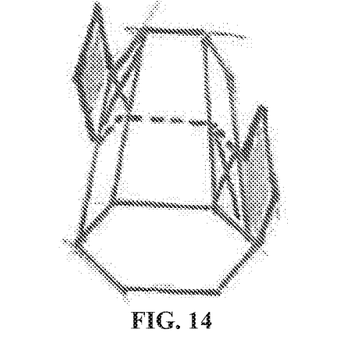
Figure 15:
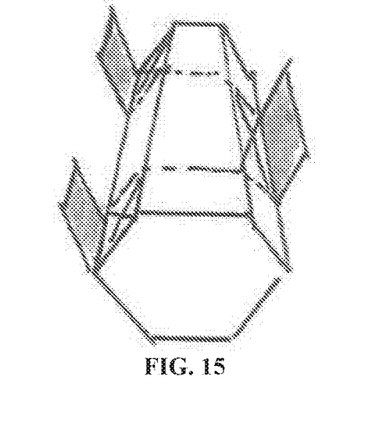
Figure 16:
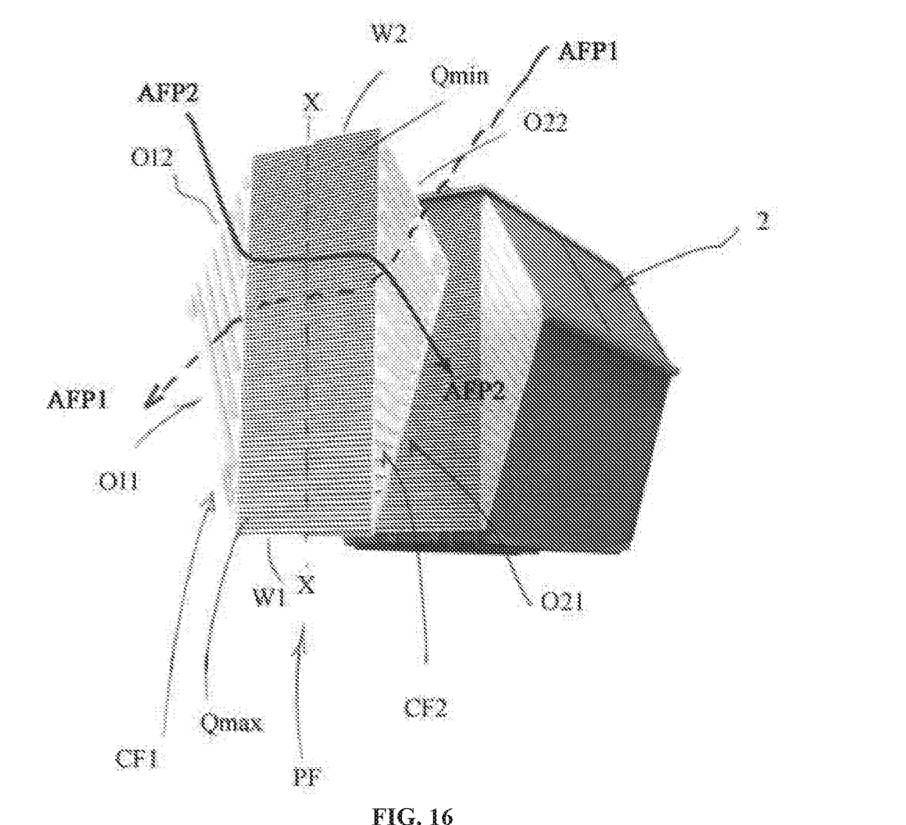
Figure 17:
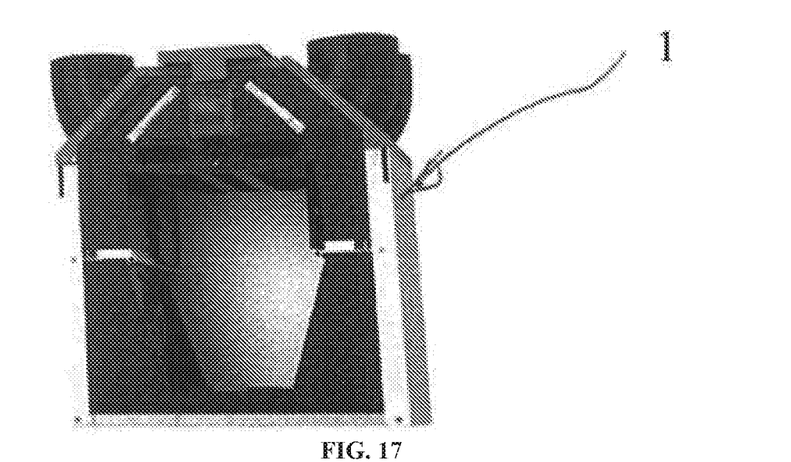

The heat recovery ventilation unit 1 provides supply air SA, preferably outside air or fresh air, to an apartment or parts thereof, and removes return air RA, preferably exhaust air or used air, from said apartment or parts thereof.

The ventilation unit 1 comprises a supply air outlet SAO for establishing supply air flow communication with said apartment, a return air inlet RAI for establishing return air flow communication with said apartment, an exhaust air outlet EAO for establishing exhaust air flow communication with the atmosphere, and an outside air inlet OAI for establishing outside air flow communication with the atmosphere. In addition, the unit 1 comprises heat exchanger 2 having first air flow passages (not shown) and second air flow passages (not shown) for transferring heat energy form return air entering said first air flow passages and exhaust air leaving said first air flow passages on the one hand, to outside air entering said second air flow passages and supply air leaving said second air flow passages on the other hand, is provided in the heat recovery ventilation unit. In addition, the unit 1 comprises a first ventilator V1 at a first location within the ventilation unit 1, for transporting air through a first air flow path AFP1 starting at said return air inlet RAI, passing through said first air flow passages in the heat exchanger 2 and ending at said exhaust air outlet EAO, and a second ventilator V2 at a second location within the ventilation unit 1, for transporting air through a second air flow path AFP2 starting at said outside air inlet OAI, passing through said second air flow passages in the heat exchanger 2 and ending at said supply air outlet SAO.

The first air flow path AFP1 and the second air flow path AFP2 comprise internal air flow ducts.

Figure 18:
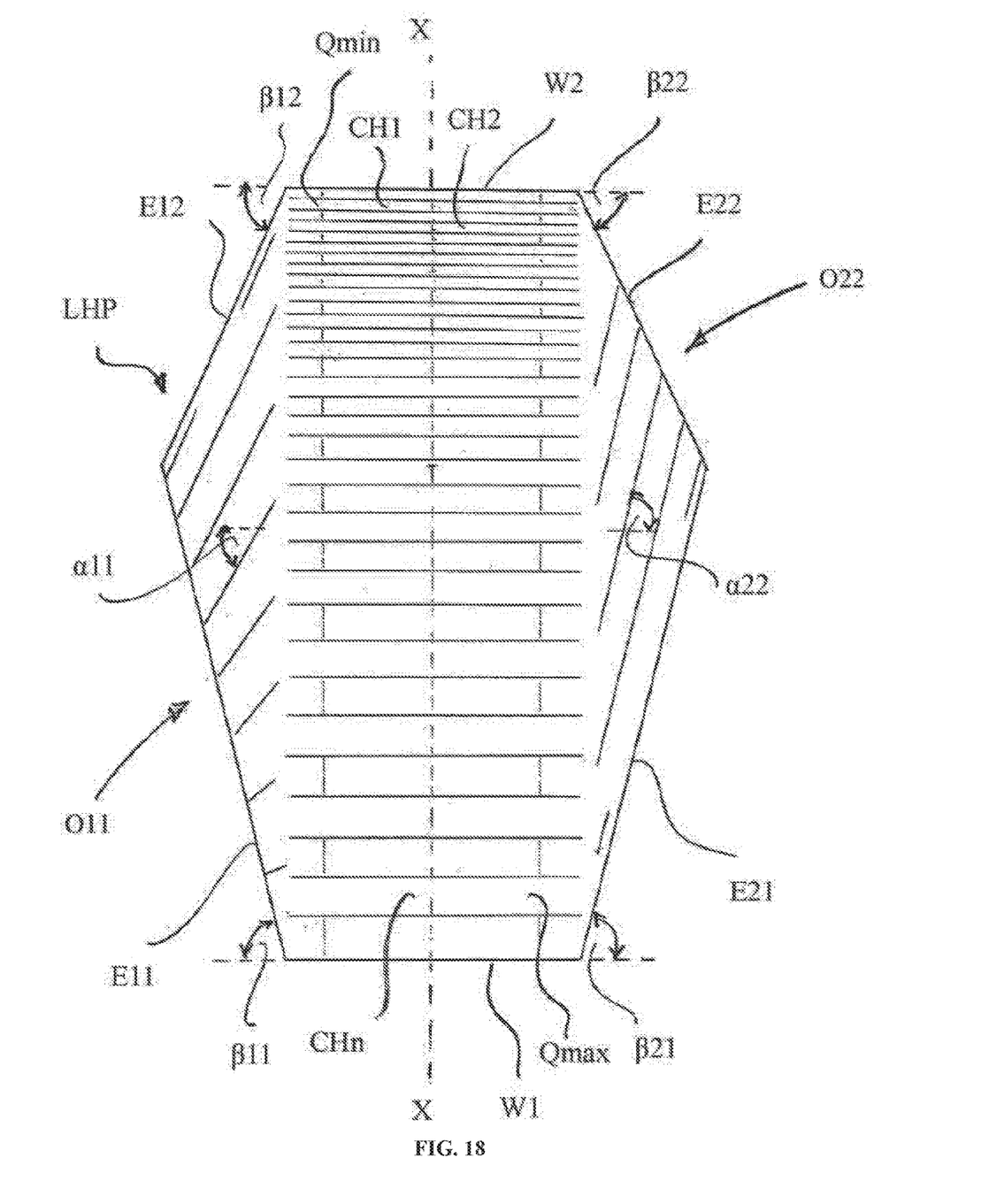
FIG. 18 shows a left-handed heat exchanger plate.

FIG. 18 shows a left-handed heat exchanger plate LHP comprising a plurality of parallel channels CH1, CH2, ..., CHn defining a parallel flow region PF of the heat exchanger 2. The parallel flow region PF is a counter flow region between the air passing through the first air flow passages AFP1 and the air passing through the second air flow passages AFP2. The parallel flow region extends between a first cross flow region CF1 and a second cross flow region CF2 of the heat exchanger 2.

Figure 19:
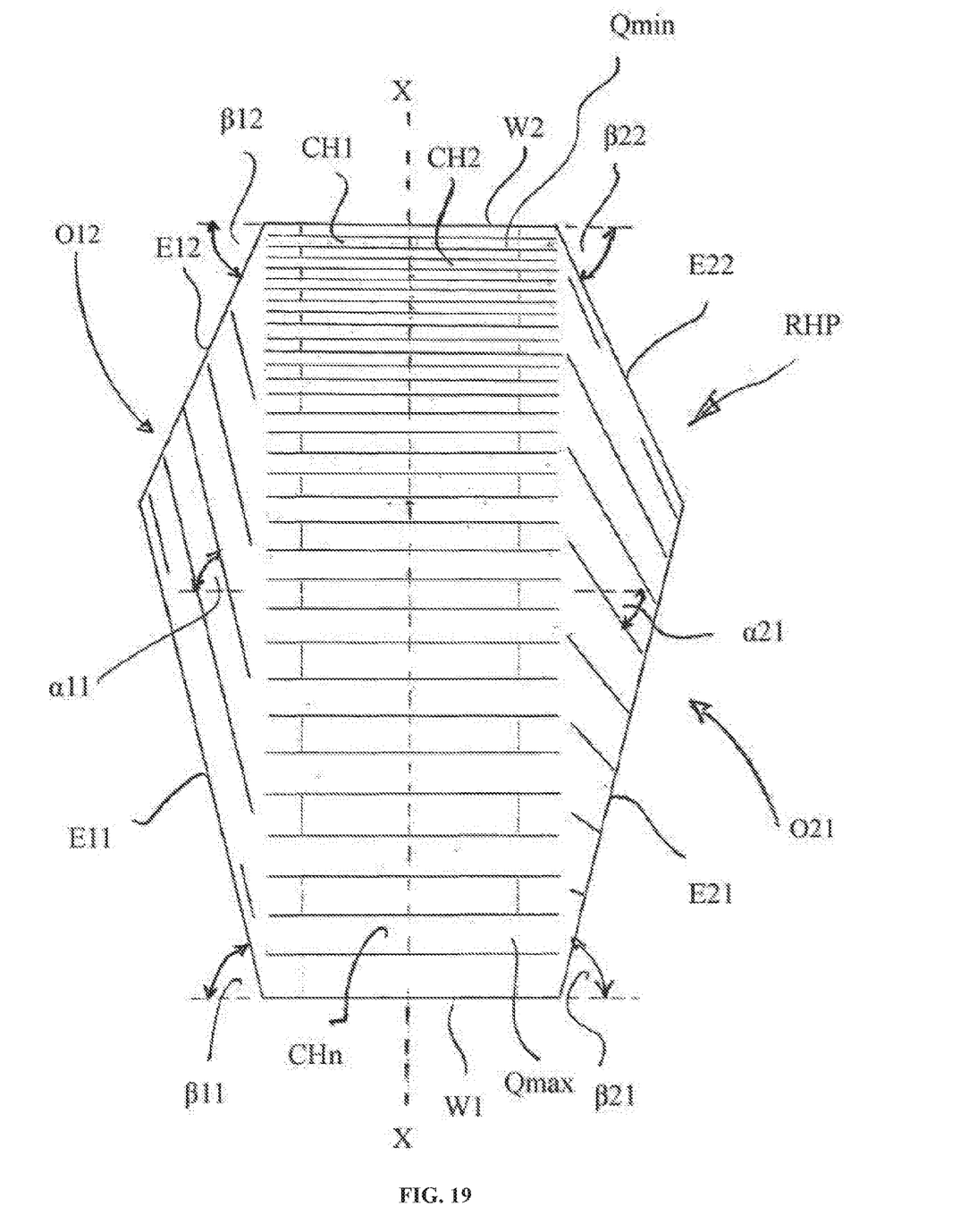
FIG. 19 shows a right-handed heat exchanger plate.

FIG. 19 shows a right-handed heat exchanger plate RHP comprising a plurality of parallel channels CH1, CH2, ..., CHn defining the parallel flow region PF of the heat exchanger 2. The parallel flow region PF is a counter flow region between the air passing through the first air flow passages AFP1 and the air passing through the second air flow passages AFP2. The parallel flow region extends between the first cross flow region CF1 and the second cross flow region CF2 of the heat exchanger 2.

The heat exchanger block 2 is composed of a stack of alternating left handed heat exchanger plates LHP and right handed heat exchanger plates RHP.

In the heat exchanger block 2, the first air flow passages (AFP1) extending between the first opening region (O11) of said first cross flow region (CF1) and the parallel flow region (PF) are arranged at an angle ($\alpha 11$) with respect to the first air flow passages (AFP1) in the parallel flow region (PF).

In the heat exchanger block 2, the first air flow passages (AFP1) extending between the second opening region (O22) of said second cross flow region (CF2) and the parallel flow region (PF) are arranged at an angle ($\alpha 22$) with respect to the first air flow passages (AFP1) in the parallel flow region (PF).

In the heat exchanger block 2, the second air flow passages (AFP2) extending between the first opening region (O21) of said second cross flow region (CF2) and the parallel flow region (PF) are arranged at an angle ($\alpha 21$) with respect to the second air flow passages (AFP2) in the parallel flow region (PF).

In the heat exchanger block 2, the second air flow passages (AFP2) extending between the second opening region (O12) of said first cross flow region (CF1) and the parallel flow region (PF) are arranged at an angle ($\alpha 12$) with respect to the second air flow passages (AFP2) in the parallel flow region (PF).

In the heat exchanger block 2, the ends of the first air flow passages (AFP1-CF1) included in said first opening region (O11) define a first plane (E11) forming an angle ($\beta 11$) with said first planar wall region (W1), said angle ($\beta 11$) having preferably a value between 65° and 85°, more preferably between 70° and 85°.

In the heat exchanger block 2, the ends of the second air flow passages (AFP2-CF1) included in said second opening region (O12) define a second plane (E12) forming an angle ($\beta 12$) with said second planar wall region (W2), said angle ($\beta$12) having preferably a value between 55° and 80°, more preferably between 65° and 75°.

In the heat exchanger block 2, the ends of the second air flow passages (AFP2-CF2) included in said first opening region (O21) define a third plane (E21) forming an angle ($\beta$21) with said first planar wall region (W1), said angle ($\beta$21) having preferably a value between 65° and 85°, more preferably between 70° and 85°.

In the heat exchanger block 2, the ends of the first air flow passages (AFP1-CF2) included in said second opening region (O22) define a fourth plane (E22) forming an angle ($\beta$22) with said second planar wall region (W2), said angle ($\beta$22) having preferably a value between 55° and 80°, preferably between 65° and 75°.

In the heat exchanger block 2, the individual flow cross-section (Q1) of flow passages of said plurality of first air flow passages (AFP1) in said parallel flow region (PF) and the individual flow cross-section (Q2) of flow passages of said plurality of second air flow passages (AFP2) in said parallel flow region (PF) gradually, preferably linearly, decrease along a straight line (x-x) perpendicular to the parallel air flow passages (AFP1 and AFP2) and from said first wall (W1) to said second wall (W2) of the block.

In the heat exchanger block 2, the ratio of the largest individual flow cross-section (Q1max and Q2max) next to the first wall (W1) and the smallest individual flow cross-section (Q1min and Q2 min) next to the second wall (W2) is between 10/1 and 10/9, preferably between 8/1 and 10/9, more preferably between 6/1 and 10/9, and most preferably between 3/1 and 10/9.

The invention claimed is:

1. A heat exchanger block comprising:
a plurality of first air flow passages (AFP1) and a plurality of second air flow passages (AFP2) adjacent said plurality of first air flow passages for exchanging heat energy between first air flows (AF1) passing through said plurality of first air flow passages (AFP1) and second air flows (AF2) passing through said plurality of second air flow passages (AFP2);
a first cross flow region (CF1) where flow passages of said plurality of first air flow passages (AFP1) and adjacent flow passages of said plurality of second air flow passages (AFP2) are arranged in crosswise relationship with respect to each other, said first cross flow region (CF1) having a first opening region (O11) including ends of said first air flow passages (AFP1) and having a second opening region (O12) including ends of said second air flow passages (AFP2);
a parallel flow region (PF) where flow passages of said plurality of first air flow passages (AFP1) and adjacent flow passages of said plurality of second air flow passages (AFP2) are arranged in parallel relationship with respect to each other; a second cross flow region (CF2) where flow passages of said plurality of first air flow passages (AFP1) and adjacent flow passages of said plurality of second air flow passages (AFP2) are arranged in crosswise relationship with respect to each other, said second cross flow region (CF2) having a first opening region (O21) including the opposite ends of said second air flow passages (AFP2) and having a second opening region (O22) including the opposite ends of said first air flow passages (AFP1);
said first cross flow region (CF1), said parallel flow region (PF) and said second cross flow region (CF2) being arranged in series along said first air flow passages (AFP1) and along said second air flow passages (AFP2), with said parallel flow region (PF) being located between said first cross flow region (CF1) and said second cross flow region (CF2) along said first air flow passages (AFP1) and along said second air flow passages (AFP2);
wherein the total flow cross-sectional area of the first opening region (O11) and of the first air flow passages (AFP1-CF1) in said first cross flow region (CF1) is greater than the total flow cross-sectional area of the second opening region (O12) and of the second air flow passages (AFP2-CF1) in said first cross flow region (CF1); and the total flow cross-sectional area of the first opening region (O21) and of the second air flow passages (AFP2-CF2) in said second cross flow region (CF2) is greater than the total flow cross-sectional area of the second opening region (O22) and of the first air flow passages (AFP1-CF2) in said second cross flow region (CF2); and
wherein the individual flow cross-section (Q1) of flow passages of said plurality of first air flow passages (AFP1) in said parallel flow region (PF) and the individual flow cross-section (Q2) of flow passages of said plurality of second air flow passages (AFP2) in said parallel flow region (PF) gradually decrease along a straight line (x-x) perpendicular to the parallel air flow passages (AFP1 and AFP2) and from said first wall (W1) to said second wall (W2) of the block.

2. The heat exchanger block as defined in claim 1, wherein the first air flow passages (AFP1) extending between the first opening region (O1) of said first cross flow region (CF1) and the parallel flow region (PF) are arranged at an angle (a11) with respect to the first air flow passages (AFP1) in the parallel flow region (PF); and the first air flow passages (AFP1) extending between the second opening region (O22) of said second cross flow region (CF2) and the parallel flow region (PF) are arranged at an angle (a22) with respect to the first air flow passages (AFP1) in the parallel flow region (PF).

3. The heat exchanger block as defined in claim 1, wherein the second air flow passages (AFP2) extending between the first opening region (O21) of said second cross flow region (CF2) and the parallel flow region (PF) are arranged at an angle (a21) with respect to the second air flow passages (AFP2) in the parallel flow region (PF); and the second air flow passages (AFP2) extending between the second opening region (O12) of said first cross flow region (CF1) and the parallel flow region (PF) are arranged at an angle (a12) with respect to the second air flow passages (AFP2) in the parallel flow region (PF).

4. The heat exchanger block as defined in claim 1, wherein the block is defined by a stack including a plurality of stacked heat exchanger plates of two types, the shape of the first type plates (P1) being complementary to the shape of the second type plates (P2) and the first type plates (P1) and the second type plates (P2) being arranged alternately within the stack for defining said plurality of first air flow passages (AFP1) and said plurality of second air flow passages (AFP2) adjacent said plurality of first air flow passages.

5. The heat exchanger block as defined in claim 1, wherein the first air flow passages (AFP1-CF1) and second air flow passages (AFP2-CF1) in said first cross flow region (CF1) have larger flow cross-sections than the first air flow passages (AFP1-PP) and second air flow passages (AFP2-PP) in said parallel flow region (PF).

6. The heat exchanger block as defined in claim 1, wherein the first air flow passages (AFP1-CF2) and second air flow passages (AFP2-CF2) in said second cross flow region (CF2) have larger flow cross-sections than the first air flow passages (AFP1-PP) and second air flow passages (AFP2-PP) in said parallel flow region (PF).

7. The heat exchanger block as defined in claim 5, wherein said first cross flow region (CF1) and said second cross flow region (CF2) each have fewer first air flow passages (AFP1-CF1, AFP1-CF2) and second air flow passages (AFP2-CF1, AFP2-CF2) than said parallel flow region (PF).

8. The heat exchanger block as defined in claim 5, wherein the ratio of the number of first air flow passages (AFP1-PP) in the parallel flow region (PF) to the number of first air flow passages (AFP1-CF1) towards the first opening region (011) in said first cross flow region (CF1) is between 10/1 and 2/1.

9. The heat exchanger block as defined in claim 5, wherein the ratio of the number of second air flow passages (AFP2-PP) in the parallel flow region (PF) to the number of second air flow passages (AFP2-CF2) towards the first opening region (021) in said second cross flow region (CF2) is between 10/1 and 2/1.

10. The heat exchanger block as defined in claim 5, wherein the ratio of the number of second air flow passages (AFP2-PP) in the parallel flow region (PF) to the number of second air flow passages (AFP2-CF1) towards the second opening region (012) in said first cross flow region (CF1) is between 15/1 and 3/1.

11. The heat exchanger block as defined in claim 5, wherein the ratio of the number of first air flow passages (AFP1-PP) in the parallel flow region (PF) to the number of first air flow passages (AFP1-CF2) towards the second opening region (022) in said second cross flow region (CF2) is between 15/1 and 3/1.

12. The heat exchanger block as defined in claim 1, wherein said first opening region (011) of the first air flow passages (AFP1-CF1) in said first cross flow region (CF1) extends between a first planar wall region (W1) of the block and a first apex region (A1) of the block;
    said second opening region (012) of the second air flow passages (AFP2-CF1) in said first cross flow region (CF1) extends between a second planar wall region (W2) of the block and said first apex region (A1) of the block;
    said first opening region (021) of the second air flow passages (AFP2-CF2) in said second cross flow region (CF2) extends between said first planar wall region (W1) of the block and a second apex region (A2) of the block; and
    said second opening region (022) of the first air flow passages (AFP1-CF2) in said second cross flow region (CF2) extends between said second planar wall region (W2) of the block and said second apex region (A2) of the block.

13. The heat exchanger block as defined in claim 12, wherein the ends of the first air flow passages (AFP1-CF1) included in said first opening region (011) define a first plane (E11) forming an angle ($\beta 11$) with said first planar wall region (W1), said angle ($\beta 1$) having a value between 65° and 85°;
    the ends of the second air flow passages (AFP2-CF1) included in said second opening region (012) define a second plane (E12) forming an angle ($\beta 12$) with said second planar wall region (W2), said angle ($\beta 12$) having a value between 55° and 80°;
    the ends of the second air flow passages (AFP2-CF2) included in said first opening region (021) define a third plane (E21) forming an angle ($\beta 21$) with said first planar wall region (W1), said angle ($\beta 21$) having a value between 65° and 85°; and
    the ends of the first air flow passages (AFP1-CF2) included in said second opening region (022) define a fourth plane (E22) forming an angle ($\beta 22$) with said second planar wall region (W2), said angle ($\beta 22$) having a value between 55° and 80.

14. The heat exchanger block as defined in claim 8, wherein the ratio of the number of first air flow passages (AFP1-PP) in the parallel flow region (PF) to the number of first air flow passages (AFP1-CF1) towards the first opening region (011) in said first cross flow region (CF1) is between 8/1 and 4/1.

15. The heat exchanger block as defined in claim 9, wherein the ratio of the number of second air flow passages (AFP2-PP) in the parallel flow region (PF) to the number of second air flow passages (AFP2-CF2) towards the first opening region (021) in said second cross flow region (CF2) is between 8/1 and 4/1.

16. The heat exchanger block as defined in claim 10, wherein the ratio of the number of second air flow passages (AFP2-PP) in the parallel flow region (PF) to the number of second air flow passages (AFP2-CF1) towards the second opening region (012) in said first cross flow region (CF1) is between 12/1 and 4/1.

17. The heat exchanger block as defined in claim 11, wherein the ratio of the number of first air flow passages (AFP1-PP) in the parallel flow region (PF) to the number of first air flow passages (AFP1-CF2) towards the second opening region (022) in said second cross flow region (CF2) is between 12/1 and 4/1.

18. The heat exchanger block as defined in claim 13, wherein
    the ends of the first air flow passages (AFP1-CF1) included in said first opening region (011) define a first plane (E11) forming an angle ($\beta 11$) with said first planar wall region (W1), said angle ($\beta 1$) having a value between 70° and 85°;
    the ends of the second air flow passages (AFP2-CF1) included in said second opening region (012) define a second plane (E12) forming an angle ($\beta 12$) with said second planar wall region (W2), said angle ($\beta 12$) having a value between 65° and 75°;
    the ends of the second air flow passages (AFP2-CF2) included in said first opening region (021) define a third plane (E21) forming an angle ($\beta 21$) with said first planar wall region (W1), said angle ($\beta 21$) having a value between 70° and 85°; and
    the ends of the first air flow passages (AFP1-CF2) included in said second opening region (022) define a fourth plane (E22) forming an angle ($\beta 22$) with said second planar wall region (W2), said angle ($\beta 22$) having a value between 65° and 75°.

\* \* \* \* \*